Patented Sept. 13, 1949

2,481,804

UNITED STATES PATENT OFFICE 2,481,804

PENICILLIN-PECTIN COMPOSITION AND METHOD OF MANUFACTURE

Barron Silvin Whittingham, New York, N. Y., assignor, by direct and mesne assignments, to Biotic Research Institute, Inc., New York, N. Y., a corporation of New York No Drawing. Application July 4, 1944, Serial No. 543,491

7 Claims. (Cl. 260—302)

The present invention relates to improvements in penicillin-pectin composition and method of manufacture, one object of the invention being the production of a penicillin compound that can be used with desirable effects both topically and orally, and which can be so formed as to be shipped to be used in various climates without the great care now necessary for its use.

Still another object of this invention is the provision of a chemical which when mixed with penicillin renders the same usable topically as well as orally by making the complete compound stable, and which permits practically no action by the stomach juices upon the penicillin, so that the effect of the latter is greatly enhanced when it reaches the intestines.

Still another object of the present invention is the production of a process for making a certain pectic substance, the preparation of a pectic substance for the precipitation of penicillin, the stabilizing of the penicillin with a pectic substance, pectic substances as a vehicle for the penicillin, the reaction of uronic acids and its homologues with penicillin, the conjugation of uronic acid and its homologues with penicillin, and the reactions or conjugations of uronates with penicillin.

In preparing this material several steps are required, but my object is first to render penicillin stable under normal conditions, and secondly to so form a compound or mixture that will not be destroyed by secretions of the stomach so that it remains available for absorption in the intestinal tract.

Another object is to provide a process for the preparation of a penicillin compound which will be stable in powder form and can be administered as before stated, topically and orally in the form of tablets powder and the like.

Preparation of the pectic substance

A 2% solution of demethylated pectin is hydrolized with 4% hydrochloric acid for from one to eight hours. The supernatant solution is filtered off, or decanted. This solution is then treated with sodium carbonate to raise the pH to 5 plus, and to this is added alcohol. A precipitate is formed and then filtered off, and washed several times with alcohol to remove acid. The resultant powder is then dried at room temperature. This dried powder being acid is now made alkaline in an aqueous solution and is now ready for use.

Precipitation of penicillin

After the normal growth of the mold takes place on its media, a felt is formed. The liquid media is now filtered to remove felt and other foreign matter. The pH of this solution is then adjusted between 3 and 4 and from 1 to 5 per cent by weight of the alkaline solution of pectic substance described above is added to this filtrate, being mixed thoroughly, until a pH of from 5 to 6.5 is reached. Penicillin is known structurally to be a strong acid with two, or a multiple of two acid groups and when it comes in contact with the sodium or other alkaline salt of this specially prepared pectic substance a reaction or conjugation or compound takes place. Since penicillin is most active in its acid form, by this process it can be precipitated at the desired pH, thereby eliminating the preparation of the unstable sodium salts. Alcohol is now added to this mixture and the pectous acid will precipitate along with the penicillin.

Although the exact structure of penicillin is not known, it is observed from this phenomenon, that the pectic substances form conjugated compounds or compounds with the penicillin, or even a reaction may have occurred. This precipitate can be quickly dried in ordinary vacuum.

It is well known that in the administration of penicillin by parenteral therapy, a large amount of the penicillin is excreted, the tedious technique in the extraction of the sodium salt of this compound, the instability and its keeping qualities are factors peculiar to these older compounds, as well as present day penicillin compounds, however the methods of manufacture and storing are also complicated and unsatisfactory, whereas with the herein set forth discovery, the resultant drug is stable, easily manufactured and put in tablet form, and can be administered not only topically, but can be administered orally with the desired results.

Under this process, penicillin is rendered stable, is not so liable to destruction, can be kept in normal atmospheres, and made into tablet forms of the desired size for ready and immediate use. This penicillin compound is found to be quite active in vivo.

What I claim as new, is:

1. The process of producing a penicillin compound for use orally as well as topically, which consists in hydrolizing pectin, filtering the supernatant solution, raising the pH of this solution to approximately 5 plus, precipitating and filtering off the precipitant, washing and drying the precipitate to form a powder, and adding this powder to a penicillin filtrate, and precipitating and drying same to provide pectous penicillin.

2. A process as claimed in claim 1, in which alcohol is employed as the precipitating agent.

3. A process as claimed in claim 1, in which the pH of approximately 3 to 4.5 is adjusted in the second filtrate.

4. The herein described process for making a stable penicillin composition, which consists in preparing a pectic substance as a stabilizer, and mixing said pectic substance with a penicillin filtrate, and precipitating out the solids with alcohol to produce a powder of penicillin and pectic substance.

5. A process as claimed in claim 4, wherein the pectic substance also regulates the pH of the penicillin filtrate.

6. A stable penicillin pectin composition suitable for topical administration, containing a solution of penicillin and from 1% to 5% by weight of a hydrolyzed pectin.

7. A stable penicillin pectin composition suitable for topical administration, containing a solution of penicillin and from 1% to 5% by weight of a substance containing a hydrolysate of pectin.

BARRON SILVIN WHITTINGHAM.

REFERENCES CITED

The following references are of record in the file of this patent:

UNITED STATES PATENTS

| Number | Name | Date |
| --- | --- | --- |
| 2,022,464 | Hall | Nov. 26, 1935 |
| 2,283,531 | Briod | May 19, 1942 |
| 2,321,400 | Lubarsky | June 8, 1943 |
| 2,333,950 | Olsen et al. | Nov. 9, 1943 |

OTHER REFERENCES

J. A. C. S., vol. 49 (Proceedings), pp. 37–39 (1927).

Bulletin of National Formulary Committee, Oct. 1940, pp. 9, 10, 3.

Journal of the American Pharmaceutical Association—Practical Pharmacy Edition, July 1942, pp. 236, 237 (167–63 Sulfa).

Lancet, Dec. 11, 1943, pp. 742–745.

Perlstein et al.: Science, V. 101 (1945), pp. 562–563.